(12) United States Patent
Wang et al.

(10) Patent No.: US 11,879,786 B1
(45) Date of Patent: Jan. 23, 2024

(54) HEAT FLUX SENSOR

(71) Applicant: SHANDONG UNIVERSITY, Jinan (CN)

(72) Inventors: Yong Wang, Jinan (CN); Yahui Huang, Jinan (CN); Wentao Zou, Jinan (CN); Hui Sun, Jinan (CN); Kunlun Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/242,523

(22) Filed: Sep. 6, 2023

(30) Foreign Application Priority Data

Dec. 26, 2022 (CN) .......................... 202211670446.6

(51) Int. Cl.
*G01K 17/00* (2006.01)
(52) U.S. Cl.
CPC .................................... *G01K 17/00* (2013.01)
(58) Field of Classification Search
CPC ..................................................... G01K 17/00
See application file for complete search history.

(56) References Cited

U.S. PATENT DOCUMENTS

| | | |
|---|---|---|
| 2015/0308906 A1 | 10/2015 | Durrer |
| 2018/0226556 A1 | 8/2018 | Jacquot |
| 2021/0156737 A1 | 5/2021 | Scorticati |

FOREIGN PATENT DOCUMENTS

| | | |
|---|---|---|
| CN | 102544347 B | 7/2012 |
| CN | 104884918 B | 9/2015 |
| CN | 110993778 A | 4/2020 |
| CN | 111579126 A | 8/2020 |
| CN | 111829694 A | 10/2020 |
| CN | 114136501 A | 3/2022 |
| CN | 115274996 A | 11/2022 |
| KR | 20220054564 A | 5/2022 |

OTHER PUBLICATIONS

Search Report of the priority application CN202211670446.6.

*Primary Examiner* — Brandi N Hopkins
*Assistant Examiner* — Janice M Soto
(74) *Attorney, Agent, or Firm* — J.C. PATENTS

(57) ABSTRACT

A heat flux sensor, comprising: a ceramic heat sink; a sensitive element made of a single-crystal material and fixed to the ceramic heat sink through a thermally conductive and electrically insulative adhesive; a heat absorption layer arranged on an upper surface of the sensitive element; a first metal electrode and a second metal electrode arranged on the upper surface of the sensitive element; a third metal electrode arranged on the upper surface of the sensitive element; a fourth metal electrode arranged on a lower surface of the sensitive element; and a fifth metal electrode arranged on an upper surface of the ceramic heat sink; wherein a voltage signal between the first metal electrode and the second metal element is a transverse voltage $U_x$, and a voltage signal between the third metal electrode and the fourth metal electrode is a longitudinal voltage $U_z$. The heat flux sensor application can be used for the measurements of transient-state and steady-state heat flux, and has dual-mode outputs of transverse and longitudinal thermoelectric voltage signals.

11 Claims, 3 Drawing Sheets

HEAT FLUX SENSOR

CROSS-REFERENCE TO RELATED APPLICATIONS

The present application claims priority to Chinese Patent Application No. 202211670446.6 filed to the CNIPA on Dec. 26, 2022 and entitled "HEAT FLUX SENSOR", the disclosure of which is hereby incorporated by reference in its entirety.

TECHNICAL FIELD

The present application belongs to the technical field of sensors, and particularly relates to a heat flux sensor.

BACKGROUND ART

Heat flux sensors used to measure heat flux density are important devices for the study of heat transfer. Heat flux sensors have a wide and important application in the aerospace field, such as the thermal protection structure design of aircrafts, the reliability design of aero-engines, the flight attitude control of aircrafts and the basic research of aerodynamics.

With the increasing Mach speed of hypersonic aircrafts, it is particularly important to measure aerodynamic heat and aerodynamic force caused by the surface transition and turbulence of aircrafts, which requires that the heat flux sensor must have a good testing capability for transient heat flux, such as a short response time. As an important technical indicator of the heat flux sensor, the response time represents its capability to distinguish transient pulsating heat flux. When an aircraft or engine runs steadily for a long time, it is also required that the heat flux sensor can be used for long-term measure of the steady-state heat flux. In addition, the harsh test environment also puts forward higher requirements on the package and size of the sensor. For example, the surface environment of aircraft is not suitable for water cooling. However, it is difficult for conventional heat flux sensors to satisfy these requirements. For example, the response time of a Gordon gauge based on the principle of temperature difference is generally on the order of hundreds of milliseconds. Due to the too long response time, it is not suitable for pulsating heat flux measurement and requires continuous water cooling. Thin film type heat flux sensors have relatively small heat capacity and faster response speed, but cannot realize the long-term measurement of the steady-state heat flux without water cooling.

Chinese Patent Publication No. CN104884918B disclosed a laser power/energy sensor utilizing an anisotropic thermoelectric material, including a copper substrate on which an oriented polycrystalline buffer layer is grown, and an oriented polycrystalline sensor element of an anisotropic transverse thermoelectric material is formed on the polycrystalline buffer layer. An absorber layer, thermally connected to the sensor element, is heated by laser radiation so as to be measured and communicates the heat to the sensor element, causing a temperature gradient across the sensor element. Spaced-apart electrodes in electrical contact with the sensor element detect a voltage, corresponding to the temperature gradient, as a measurement result of the power/energy of the incident laser radiation.

Chinese Patent Publication No. CN102544347B disclosed a quick-response photothermal-induced-voltage thin film material and an application thereof, and specifically disclosed an induced voltage thin film material, which selects $La_{1-x}Sr_xCoO_3$ (x=0.1–0.6) as a quick-response induced voltage material and grows a thin film on an inclined $SrTiO_3$ single-crystal substrate by pulsed laser deposition, and has the induced voltage effect of optical and thermal radiation. That is, a pulsed laser with a pulse width of 28 ns and a wavelength of 248 nm is irradiated on the thin film, and a quick-response high-volt voltage signal with a response time of 7 ns and a full width at half maximum of 17 ns is obtained in the inclination direction of the thin film. The voltage signal is collected by a high-frequency oscilloscope. The thin film material can be used to manufacture some photothermal-induced-voltage detectors with fast sensitive response, thereby improving the response speed of optimal and thermal measurement instruments.

Chinese Patent Publication No. CN110993778A disclosed a heat flux sensor based on a thin film transverse thermoelectric effect, including: metal electrodes, a heat absorption coating, an inclined epitaxial thin film, a miscut single-crystal substrate, a thermal conducting adhesive, small holes and a metal heat sink. The metal electrodes and the heat absorption coating are arranged on an upper surface of the inclined epitaxial thin film, and the metal electrodes are arranged at two ends of the heat absorption coating. The inclined epitaxial thin film is grown on the miscut single-crystal substrate, and the miscut single-crystal substrate is fixed on the metal heat sink through the thermal conducting adhesive. Insulating small holes running through the metal heat sink are formed at two ends of the metal heat sink. Metal leads welded on the metal electrodes pass through the metal heat sink through the insulating small holes to be connected to a voltage measurement system, and the metal heat sink is connected to an object to be measured. There is an included angle between a crystal c-axis and normal of the inclined epitaxial thin film. The heat flux sensor can realize heat flux detection through a thin film material, and has high sensitivity and fast response speed.

Chinese Patent Publication No. CN114136501A disclosed a thin film type heat flux sensor structure and a metal electrode preparation method thereof, and specifically disclosed a thin film type heat flux sensor structure, including a substrate, wherein an inclined thermoelectric thin film is arranged on the substrate; highly insulating thin films are arranged at two ends of the inclined thermoelectric thin film, and the highly insulating thin films have a trapezoid-like section; metal electrodes are arranged on upper surfaces and slopes of the highly insulating thin films; through holes are formed at two ends of the substrate; metal leads are arranged in the through holes; the metal leads pass through the through holes to be welded and fixed to the substrate; and, the metal leads are connected to an external voltage measurement system. The heat flux sensor structure, in which the inclined thermoelectric thin film is directly grown on the insulating substrate with high thermal conductivity, can quickly measure the heat flux.

The thin film type heat flux sensor is used for laser and heat flux detection. This sensor uses a thermoelectric thin film material with thermoelectric anisotropy and nanometer-scale thickness as a sensitive element of the sensor, and the response time is fast due to its small heat capacity. The operation principle is only to utilize the transverse thermoelectric effect, and the output is only a transverse voltage signal (a voltage signal perpendicular to the heat flux) in a single mode. The thermal conductivity of the oxide single-crystal substrate or oxide buffer layer is relatively low (for example, the thermal conductivity of the $LaAlO_3$ single crystal at room temperature is generally lower than 13.6 $Wm^{-1}K^{-1}$, the thermal conductivity of the $SrTiO_3$ single crystal at room temperature is generally lower than 10 $Wm^{-1}K^{-1}$, and the thermal conductivity of the MgO single crystal at room temperature is generally lower than 40 $Wm^{-1}K^{-1}$), so that the thermal boundary resistance between the thermoelectric sensitive thin film and the substrate or buffer layer is relatively high. Thus, the heat flux sensor requires water cooling to realize the measurement of steady-state heat flux due to the high thermal boundary resistance.

SUMMARY

In view of at least one of the deficiencies of the prior art, the present application provides a heat flux sensor.

For this purpose, the present application provides a heat flux sensor, comprising:

a ceramic heat sink;

a sensitive element, which is fixed to the ceramic heat sink through a thermally conductive and electrically insulative adhesive, the sensitive element being made of a single-crystal material with high thermal conductivity and high electrical conductivity, and the single-crystal material having a resistivity of less than or equal to 0.02 $\Omega \cdot cm$ at room temperature and a thermal conductivity of larger than or equal to 270 $Wm^{-1}K^{-1}$ at room temperature, there being an included angle θ between c axis and normal of the single-crystal material, where $0.1° < \theta < 45°$;

a heat absorption layer, which is arranged on an upper surface of the sensitive element; and metal electrodes, comprising:

a first metal electrode and a second metal electrode, which are arranged on the upper surface of the sensitive element, the first metal electrode and the second metal electrode being arranged at two ends of the heat absorption layer, a voltage signal between the first metal electrode and the second metal element being a transverse voltage $U_x$, and an approximate expression of the transverse voltage $U_x$ is expressed as: $U_x = l*(S_{ab} - S_c) * \nabla T_z * \sin(2\theta)/2$, where $S_{ab}$ is a thermoelectric coefficient in ab plane of the single-crystal material, $S_c$ is a thermoelectric coefficient along a c-axis direction of the single-crystal material, $\nabla T_z$ is a temperature gradient in a thickness direction, that is, a z-axis direction, of the single-crystal material and/is a distance between the first metal electrode and the second metal electrode;

a third metal electrode arranged on the upper surface of the sensitive element and a fourth metal electrode arranged on a lower surface of the sensitive element, the third metal electrode and the fourth metal electrode being arranged opposite to each other, a voltage signal between the third metal electrode and the fourth metal electrode being a longitudinal voltage $U_z$, and an approximate expression of the longitudinal voltage $U_z$ is expressed as: $U_z = (S_{ab} \sin^2(\theta) + S_c \cos^2(\theta)) * \Delta T_z$, where $\Delta T_z$ is a temperature difference between an upper surface and an lower surface in the thickness direction of the single-crystal material; the third metal electrode being spaced apart from the first metal electrode, the third metal electrode and the second metal electrode being fixed at two ends of the upper surface of the sensitive element; and a fifth metal electrode arranged on an upper surface of the ceramic heat sink and bonded to the fourth metal electrode, the fourth metal electrode being larger than the third metal electrode in size.

In some embodiments of the present application, a thermal conductivity of the ceramic heat sink at room temperature is larger than 250 $Wm^{-1}K^{-1}$, and an overall volume of the ceramic heat sink is larger than or equal to 8 $cm^3$.

In some embodiments of the present application, the ceramic heat sink is made of any one of aluminum nitride ceramics, aluminum oxide ceramics and silicon nitride ceramics.

In some embodiments of the present application, the single-crystal material has a thickness of 20 to 500 μm.

In some embodiments of the present application, the upper surface and the lower surface of the single-crystal material are polished surfaces, which have a surface roughness RMS (Root Mean Square) of less than or equal to 1 nm.

In some embodiments of the present application, the heat absorption layer has a thickness of 300 to 2000 nm.

In some embodiments of the present application, the heat absorption layer is made of a C/SiC composite material having an atomic content of C element of larger than or equal to 65%.

In some embodiments of the present application, the first metal electrode, the second metal electrode, the third metal electrode and the fourth metal electrode are Ni/Pt thin film electrodes or Ni/Au thin film electrodes; when the Ni/Pt thin film electrodes are adopted, for each of the Ni/Pt thin film electrodes, an Ni electrode with a thickness of 20 to 100 nm is first grown on the sensitive element, and a Pt electrode with a thickness of 50 to 100 nm is then grown on the Ni electrode; and, when the Ni/Au thin film electrodes are adopted, for each of the Ni/Au thin film electrodes, an Ni electrode with a thickness of 20 to 100 nm is first grown on the sensitive element, and an Au electrode with a thickness of 50 to 100 nm is then grown on the Ni electrode.

In some embodiments of the present application, the fifth metal electrode is a Cu/Pt thin film electrode or a Cu/Au thin film electrode; when the Cu/Pt thin film electrode is adopted, a Cu electrode with a thickness of 20 to 30 μm is first grown on the ceramic heat sink, and a Pt electrode with a thickness of 50 to 150 nm is then grown on the Cu electrode; and, when the Cu/Au thin film electrode is adopted, a Cu electrode with a thickness of 20 to 30 μm is first grown on the ceramic heat sink, and an Au electrode with a thickness of 50 to 150 nm is then grown on the Cu electrode.

In some embodiments of the present application, the thermally conductive and electrically insulative adhesive has a thickness of less than 30 μm.

In some embodiments of the present application, an area of the fifth metal electrode is larger than an area of the fourth metal electrode in a transverse direction.

Compared with the prior art, the present application has the following advantages and positive effects.

(1) According to the heat flux sensor provided in at least one embodiment of the present application, the sensitive element is made of a single-crystal material with high thermal conductivity and high electrical conductivity. Its low resistivity is beneficial to achieving a fast response time of the heat flux sensor, and as it has the high thermal conductivity (e.g., thermal diffusion coefficient) at the same time, the heat accumulated on the heat flux sensor can be quickly diffused. Thus, the heat flux sensor can be used for the measurement of steady-state heat flux without cooling water, and can also accurately measure high-frequency transient heat flux.

(2) According to the heat flux sensor provided in at least one embodiment of the present application, the first metal electrode and the second metal electrode are arranged at two ends of the upper surfaces of the sensitive element and used to collect transverse thermoelectric signals of the sensitive element. Meanwhile, the third metal electrode and the fourth metal electrode are arranged on the upper surface and the lower surface of the sensitive element, respectively, and used to collect longitudinal thermoelectric signals of the sensitive element. Thus, dual-mode signal outputs are realized, and the two signals can be self-calibrated, thereby ensuring the reliability of the measurement result.

(3) According to the heat flux sensor provided in at least one embodiment of the present application, the sensitive element is made of a miscut single-crystal material, and no inclined substrate material (e.g., miscut single-crystal substrate or inclined buffer layer) is required to induce the growth of an inclined thin film to realize the transverse thermoelectric effect, so that it is suitable for preparing large-area heat flux sensors.

Figure 1:
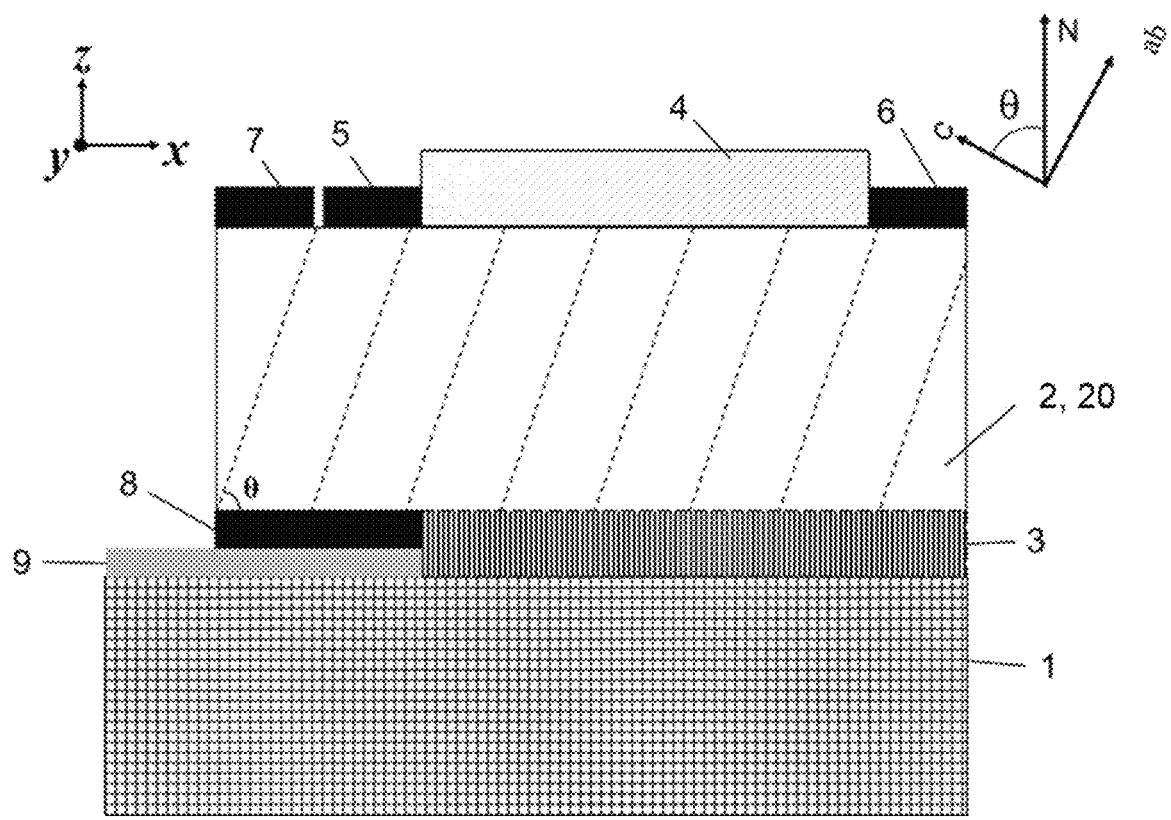
FIG. 1 is a schematic sectional view of a heat flux sensor according to an embodiment of the present application.

in which: 1: ceramic heat sink; 2: sensitive element; 20: single-crystal material; 3: thermally conductive and electrically insulative adhesive; 4: heat absorption layer; 5: first metal electrode; 6: second metal electrode; 7: third metal electrode; 8: fourth metal electrode; 9: fifth metal electrode; 101: Ni electrode; 102: Pt electrode; 103: Au electrode; 201: Cu electrode; 202: Pt electrode; and, 203: Au electrode.

DETAILED DESCRIPTION OF EMBODIMENTS

The present application will be specifically described below by exemplary implementations. However, it should be understood that elements, structures and features in one implementation may be advantageously incorporated into other implementations without further recitation.

In the description of the present application, it is to be noted that, the orientation or position relation indicated by terms "upper", "lower", "left", "right", "inner", "outer" or the like is an orientation or position relation shown by the accompanying drawings, merely for describing the present application and simplifying the description rather than indicating or implying that the specified device or element must have a particular orientation or be constructed and operated in a particular orientation. Therefore, the terms should not be interpreted as limitations to the present application.

In the existing thin film type heat flux sensor for heat flux detection, a thermoelectric thin film material with thermoelectric anisotropy and nanometer-scale thickness is used as a sensitive element of the sensor, and the response time is fast due to its small heat capacity; and, the operation principle is only to utilize the transverse thermoelectric effect, and the output is a transverse voltage signal in a single mode. The thermal conductivity of an oxide single-crystal substrate or oxide buffer layer used in the existing heat flux sensors is relatively low, so that the thermal boundary resistance between the thermoelectric sensitive thin film and the substrate or buffer layer is relatively high, and the heat flux sensor requires water cooling to realize the measurement of steady-state heat flux due to the high thermal boundary resistance.

The present application provides a heat flux sensor. A sensitive element is made of a miscut single-crystal material with high thermal conductivity, high electrical conductivity and micron-scale thickness. The single-crystal material possesses small thickness and high electrical conductivity, so that the heat flux sensor has a fast response speed and suitable for the measurement of transient heat flux. Meanwhile, due to the high thermal conductivity, heat accumulated on a lower surface of the heat flux sensor can be quickly diffused, so that the heat flux sensor can be used for the measurement of steady-state heat flux. In addition, dual-mode signal outputs of transverse thermoelectric signal and longitudinal thermoelectric signal allows the self-calibration for the heat flux sensor, thereby ensuring the accuracy of the measurement result. The heat flux sensor will be described below in detail with reference to the accompanying drawings.

Figure 2:
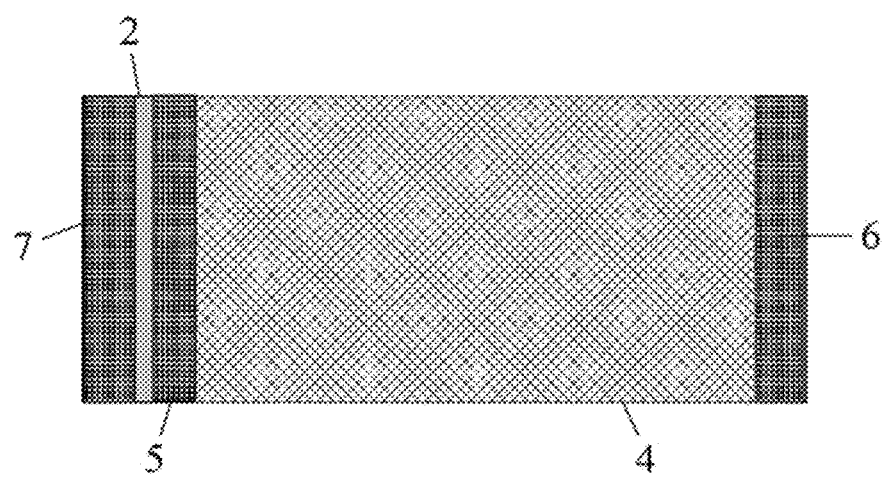
FIG. 2 is a top view of the heat flux sensor according to an embodiment of the present application.
Figure 3A:
FIG. 3a is a schematic structure diagram of the Ni/Pt thin film electrode according to an embodiment of the present application.
Figure 3B:
FIG. 3b is a schematic structure diagram of the Ni/Au thin film electrode according to an embodiment of the present application.
Figure 3C:
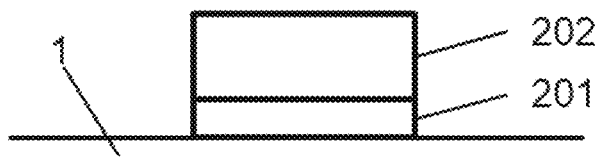
FIG. 3c is a schematic structure diagram of the Cu/Pt thin film electrode according to an embodiment of the present application.
Figure 3D:
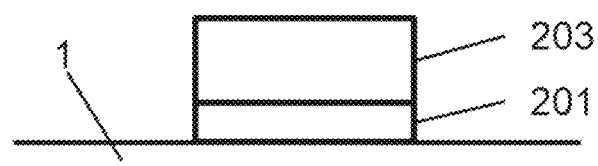
FIG. 3d is a schematic structure diagram of the Cu/Au thin film electrode according to an embodiment of the present application.

With reference to FIGS. 1 and 2, an embodiment of the present application provides a heat flux sensor. In a three-dimensional coordinate system, a length of the heat flux sensor is in an x-axis direction, a width of the heat flux sensor is in a y-axis direction and a thickness of the heat flux sensor is in a z-axis direction. The heat flux sensor comprises:

a ceramic heat sink 1;

a sensitive element 2, which is fixed to the ceramic heat sink 1 through a thermally conductive and electrically insulative adhesive 3, the sensitive element 2 being made of a single-crystal material, the single-crystal material having a resistivity of less than or equal to 0.02 Ω·cm at room temperature and a thermal conductivity of larger than or equal to 270 $Wm^{-1}K^{-1}$ at room temperature, there being an included angle θ between c axis and normal of the single-crystal material, where 0.1°<θ<45°;

a heat absorption layer 4, which is arranged on an upper surface of the sensitive element 2; and metal electrodes, comprising:

a first metal electrode 5 and a second metal electrode 6, which are arranged on the upper surface of the sensitive element 2, the first metal electrode 5 and the second metal electrode 6 being arranged at two ends of the heat absorption layer 4 in the x-axis direction, respectively, a voltage signal between the first metal electrode 5 and the second metal element 6 being a transverse voltage $U_x$, and an approximate expression of the $U_x$ is expressed as: $U_x = l*(S_{ab} - S_c)*\nabla T_z*\sin(2\theta)/2$, where $S_{ab}$ is a thermoelectric coefficient in ab plane of the single-crystal material, $S_c$ is a thermoelectric coefficient along a c-axis direction of the single-crystal material, $\nabla T_z$ is a temperature gradient in a thickness direction (i.e., the z-axis direction) of the single-crystal material (i.e., the sensitive element 2) and/is a distance between the first metal electrode 5 and the second metal electrode 6 in the x-axis direction; and a third metal electrode 7 and a fourth metal electrode 8, which are arranged on the upper surface and a lower surface of the sensitive element 2, respectively, the third metal electrode 7 and the fourth metal electrode 8 being arranged opposite to each other in the z-axis direction, a voltage signal between the third metal electrode 7 and the fourth metal electrode 8 being a longitudinal voltage $U_z$, and an approximate expression of the $U_z$ is expressed as: $U_z=(S_{ab}\sin^2(\theta)+S_c\cos^2(\theta))*\Delta T_z$, where $\Delta T_z$ is a temperature difference between the upper surface and the lower surface in the thickness direction of the single-crystal material (e.g., the sensitive element 2); the third metal electrode 7 being spaced apart from the first metal electrode 5 in the x-axis direction, the third metal electrode 7 and the second metal electrode 6 being fixed at two ends of the upper surface of the sensitive element 2 in the x-axis direction.

According to the heat flux sensor provided in the above embodiment of the present application, there is an included angle θ between the c axis and the normal of the single-crystal material, and 0.1°<θ<45°. The included angle θ in this range allows the heat flux sensor not to require an inclined substrate material (e.g., a miscut single-crystal substrate or inclined buffer layer) to induce the growth of a inclined thin film to realize the transverse thermoelectric effect, and it is suitable for preparing large-area heat flux sensors and position-sensitive sensor arrays. It is to be noted that, if θ is too small (0<θ<0.1°), the signal of the transverse voltage $U_x$ will be very small (close to 0), so that the heat flux sensor can only output the signal of the longitudinal voltage $U_z$ in a single mode. If θ is too large (45°<θ), an amplitude of the signal of the transverse voltage $U_x$ will not increase with the increase of the angle θ. In a specific embodiment of the present application, the included angle θ between the c axis and the normal of the single-crystal material is equal to 30°.

According to the heat flux sensor provided in the above embodiment of the present application, since an existing substrate material is cancelled, metal electrodes may be arranged on the upper and lower surfaces of the sensitive element 2, respectively. By providing two pairs of metal electrodes in the x-axis direction and the y-axis direction, respectively, the transverse voltage $U_x$ and the longitudinal voltage $U_z$ of the sensitive element 2 may be acquired, respectively, so that a transverse thermoelectric signal and a longitudinal thermoelectric signal of the sensitive element 2 are obtained. Thus, dual-mode signal outputs are realized, and the two signals can be self-calibrated, thereby ensuring the reliability of the measurement result.

In the above embodiment of the present application, the single-crystal material used to make the sensitive element 2 has low resistivity (i.e., high electrical conductivity), so the heat flux sensor is suitable for the measurement of transient heat flux. Meanwhile, the single-crystal material has high thermal conductivity, so the heat accumulated on the lower surface of the heat flux sensor can be quickly diffused, and the heat flux sensor is suitable for the measurement of steady-state heat flux without cooling water. In a specific embodiment, the sensitive element 2 has a resistivity of 0.01 Ω·cm at room temperature and a thermal conductivity of 300 $Wm^{-1}K^{-1}$ at room temperature.

In some embodiments of the present application, a thermal conductivity of the ceramic heat sink 1 at room temperature is larger than 250 $Wm^{-1}K^{-1}$, and an overall volume of the ceramic heat sink 1 is larger than or equal to 8 $cm^3$. It is to be noted that, if the ceramic heat sink 1 is large in volume, it is more advantageous for the measurement of steady-state heat flux. The volume of the ceramic heat sink 1 may be selected according to actual needs. In a specific embodiment of the present application, the ceramic heat sink 1 is made of high-purity aluminum nitride ceramics, the thermal conductivity of the ceramic heat sink 1 is 300 $Wm^{-1}K^{-1}$, and the overall volume of the ceramic heat sink is 10 $cm^3$.

In some embodiments of the present application, the ceramic heat sink 1 is made of any one of aluminum nitride ceramics, aluminum oxide ceramics and silicon nitride ceramics. It is to be noted that, the material used to make the ceramic heat sink 1 may be determined according to actual needs, and is not limited to aluminum nitride ceramics, aluminum oxide ceramics and silicon nitride ceramics, as long as it is ensured that the thermal conductivity is larger than 250 $Wm^{-1}K^{-1}$ and the overall volume of the ceramic heat sink 1 is larger than or equal to 8 $cm^3$.

In some embodiments of the present application, the single-crystal material (i.e., the sensitive element 2) has a thickness of 20 to 500 μm. A smaller thickness is advantageous for rapid heat transfer of the heat flux sensor, so that the heat flux sensor is suitable for the measurement of steady-state heat flux without cooling water. In a specific embodiment of the present application, the sensitive element 2 has a thickness of 100 μm.

In some embodiments of the present application, the upper and lower surfaces of the single-crystal material (i.e., the sensitive element 2) are polished surfaces, which have a surface roughness RMS (Root Mean Square) of less than or equal to 1 nm. In a specific embodiment of the present application, the surface roughness RMS of the single-crystal material is 0.24 nm. It is to be noted that, if the sensitive element 2 has smaller surface roughness, it is easier to form ohmic contact with the first, second, third and fourth metal electrodes, and it is more advantageous to accurately measure the $U_x$ and the $U_z$. Meanwhile, adhesion force between the metal electrodes and the sensitive element 2 is larger, and the heat flux sensor has higher reliability in an extreme environment.

In some embodiments of the present application, the heat absorption layer 4 has a thickness of 300 to 2000 nm. In a specific embodiment of the present application, the heat absorption layer 4 has a thickness of 500 nm. However, the thickness of the heat absorption layer 4 is not limited to 500 nm, it may also be 800 nm, 1000 nm, 1200 nm, 1500 nm, 1800 nm, etc. and can be specifically determined according to actual needs.

In some embodiments of the present application, the heat absorption layer 4 is made of a C/SiC composite material having an atomic content of C element of larger than or equal to 65%. In a specific embodiment of the present application, the heat absorption layer 4 is made of a C/SiC composite material having an atomic content of C element of 80%.

In some embodiments of the present application, the first metal electrode 5, the second metal electrode 6, the third metal electrode 7 and the fourth metal electrode 8 are Ni/Pt thin film electrodes or Ni/Au thin film electrodes; each Ni/Pt thin film electrode comprises an Ni electrode 101 with a thickness of 20 to 100 nm grown on the sensitive element 2, and a Pt electrode 102 with a thickness of 50 to 100 nm grown on the Ni electrode 101; and, each Ni/Au thin film electrode comprises an Ni electrode 101 with a thickness of 20 to 100 nm grown on the sensitive element 2, and an Au electrode 103 with a thickness of 50 to 100 nm grown on the Ni electrode 101.

In a specific embodiment of the present application, the first metal electrode 5, the second metal electrode 6, the third metal electrode 7 and the fourth metal electrode 8 are the Ni/Pt thin film electrodes, and in each Ni/Pt thin film electrode, the Ni electrode 101 has a thickness of 50 nm, and the Pt electrode 102 has a thickness of 80 nm.

In some embodiments of the present application, the heat flux sensor further comprises a fifth metal electrode 9 which is arranged on an upper surface of the ceramic heat sink 1 and bonded to the fourth metal electrode 8, and an area of the fifth metal electrode 9 in the xy plane is larger than that of the fourth metal electrode 8. The area of the fifth metal electrode 9 being larger than that of the fourth metal electrode 8 is to facilitate connection between an external metal lead and the fifth metal electrode 9. The voltage signal on the fourth metal electrode 8 can be obtained by the external metal lead, and the external metal lead will not increase a distance between the sensitive element 2 and the ceramic heat sink 1, so that the thermal resistance between the sensitive element 2 and the ceramic heat sink 1 is reduced as far as possible.

In some embodiments of the present application, the fifth metal electrode 9 is bonded to the fourth metal electrode 8 via silver paste.

In some embodiments of the present application, the fifth metal electrode 9 is a Cu/Pt thin film electrode or a Cu/Au thin film electrode; the Cu/Pt thin film electrode comprises a Cu electrode 201 with a thickness of 20 to 30 μm grown on the ceramic heat sink 1 and a Pt electrode 202 with a thickness of 50 to 150 nm grown on the Cu electrode 201; and, the Cu/Au thin film electrode comprises a Cu electrode 201 with a thickness of 20 to 30 μm grown on the ceramic heat sink 1 and an Au electrode 203 with a thickness of 50 to 150 nm grown on the Cu electrode 201.

In a specific embodiment of the present application, the fifth metal electrode 9 is the Cu/Pt thin film electrode in which the Cu electrode 201 has a thickness of 25 μm, and the Pt electrode 202 has a thickness of 100 nm.

In some embodiments of the present application, the thermally conductive and electrically insulative adhesive 3 has a thickness of less than 30 μm. In a specific embodiment of the present application, the thermally conductive and electrically insulative adhesive 3 has a thickness of 15 μm. It is to be noted that, the smaller the thickness of the thermally conductive and electrically insulative adhesive 3 is, the smaller the thermal resistance of an interface between the sensitive element 2 and the ceramic heat sink 1 is.

The operation principle of the heat flux sensor in the present application will be specifically described below.

When a thermal radiation source irradiates the upper surface of the heat absorption layer 4, a temperature gradient is generated between the upper and lower surfaces of the sensitive element 2. Due to the transverse thermoelectric effect, a voltage $U_x$ is measured between the first metal electrode 5 and the second metal electrode 6. The approximate expression of the voltage $U_x$ is expressed as: $U_x = l*(S_{ab}-S_c)*\nabla T_z*\sin(\theta)/2$, where $S_{ab}$ is a thermoelectric coefficient of the single-crystal material in an ab plane, $S_c$ is a thermoelectric coefficient along the c-axis direction of the single-crystal material, $\nabla T_z$ is a temperature gradient in a thickness direction (i.e., the z-axis direction) of the single-crystal material and/is a distance between the first metal electrode 5 and the second metal electrode 6. A heat flux density q can be calculated from the voltage $U_x$ measured at the first metal electrode 5 and the second metal electrode 6 according to the definition of q: $q=-k*\nabla T_z$, where k is the thermal conductivity of the single-crystal material. Meanwhile, due to the longitudinal thermoelectric effect, a voltage $U_z$ is measured between the third metal electrode 7 and the fourth metal electrode 8. The approximate expression of the voltage $U_z$ is expressed as: $U_z=(S_{ab}\sin^2(\theta)+S_c\cos^2(\theta))*\Delta T_z$, where $\Delta T_z$ is a temperature difference between the upper and lower surfaces in the thickness direction of the single-crystal material. The heat flux density q can be calculated from the voltage $U_z$ measured at the third metal electrode 7 and the fourth metal electrode 8 according to the definition of q: $q=-k*\nabla T_z=-k*\Delta T_z/D$, where D is the thickness of the sensitive element 2.

Figure 4:
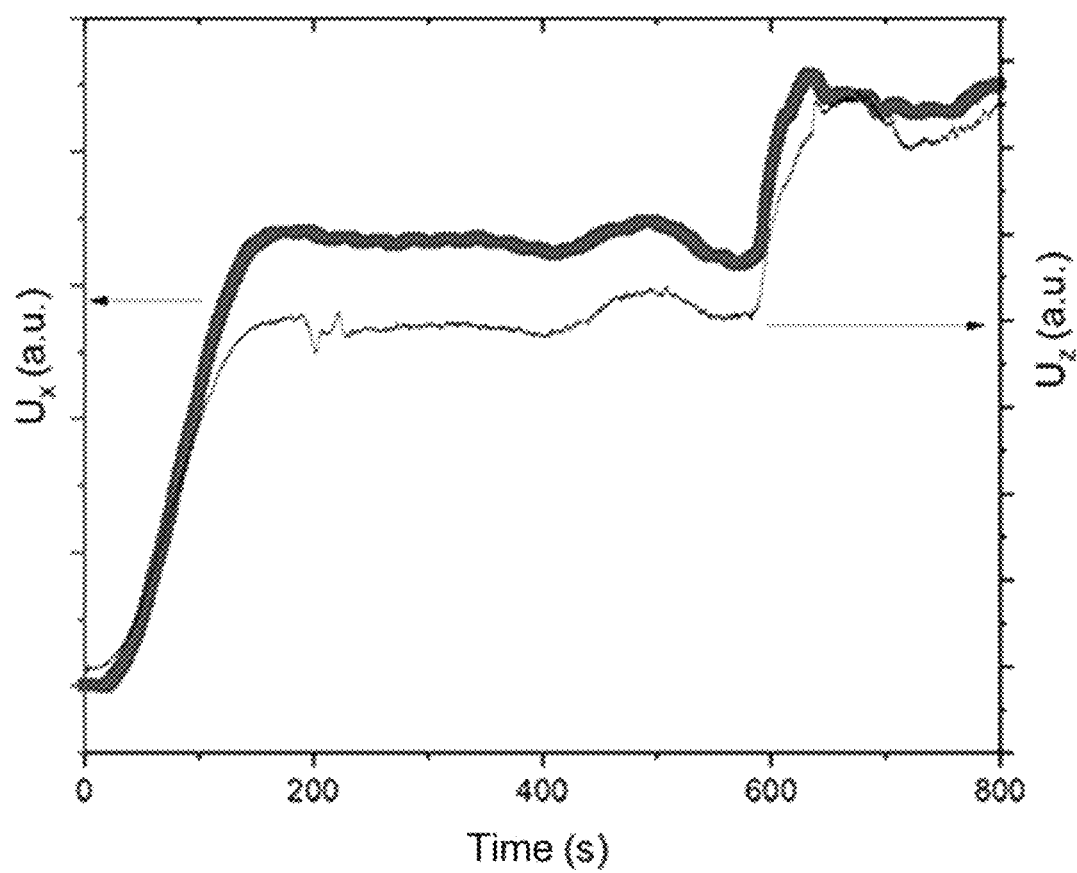
FIG. 4 is a schematic diagram of dual-mode signal outputs of $U_x$ and $U_z$ of the heat flux sensor according to an embodiment of the present application.

The results of dual-mode signal outputs of $U_x$ and $U_z$ of the heat flux sensor in the embodiments of the present application is shown in FIG. 4. Two voltage signals of $U_x$ and $U_z$ are measured in the x direction and z direction of a 4H-SiC single crystal miscut at 12°. The two voltage signals are highly consistent in the evolution tendency, so that the two voltage signals can be self-calibrated.

The foregoing embodiments are used for explaining the present application and not intended to limit the present application. Any modifications and alterations made to the present application without departing from the spirit of the present application and the protection scope of the claims shall fall into the protection scope of the present application.

The invention claimed is:

1. A heat flux sensor, comprising:
   a ceramic heat sink;
   a sensitive element fixed to the ceramic heat sink through a thermally conductive and electrically insulative adhesive, the sensitive element being made of a single-crystal material with high thermal conductivity and high electrical conductivity, and the single-crystal material having a resistivity of less than or equal to 0.02 Ω·cm at room temperature and a thermal conductivity of larger than or equal to 270 $Wm^{-1}K^{-1}$ at room temperature, there being an included angle θ between c axis and normal of the single-crystal material, where 0.1°<θ<45°;
   a heat absorption layer arranged on an upper surface of the sensitive element; and
   metal electrodes, comprising:
   a first metal electrode and a second metal electrode, which are arranged on the upper surface of the sensitive element, the first metal electrode and the second metal electrode being arranged at two ends of the heat absorption layer, a voltage signal between the first metal electrode and the second metal element being a transverse voltage $U_x$, and an approximate expression of the transverse voltage $U_x$ is expressed as: $U_x=l*(S_{ab}-S_c)*\nabla T_z*\sin(2\theta)/2$, where $S_{ab}$ is a thermoelectric coefficient in an ab plane of the single-crystal material, Se is a thermoelectric coefficient along a c-axis direction of the single-crystal material, $\nabla T_z$ is a temperature gradient in a thickness direction, that is, a z-axis direction, of the single-crystal material and/is a distance between the first metal electrode and the second metal electrode;
   a third metal electrode arranged on the upper surface of the sensitive element and a fourth metal electrode arranged on a lower surface of the sensitive element, the third metal electrode and the fourth metal electrode being arranged opposite to each other, a voltage signal between the third metal electrode and the fourth metal electrode being a longitudinal voltage $U_z$, and an approximate expression of the longitudinal voltage $U_z$ is expressed as: $U_z=(S_{ab}\sin^2(\theta)+S_c\cos^2(\theta))*\Delta T_z$, where $\Delta T_z$ is a temperature difference between an upper surface and an lower surface in the thickness direction of the single-crystal material; the third metal electrode being spaced apart from the first metal electrode, and the third metal electrode and the second metal electrode being fixed at two ends of the upper surface of the sensitive element; and a fifth metal electrode arranged on an upper surface of the ceramic heat sink and bonded to the fourth metal electrode, the fourth metal electrode being larger than the third metal electrode in size.

2. The heat flux sensor according to claim 1, wherein a thermal conductivity of the ceramic heat sink at room temperature is larger than 250 $Wm^{-1}K^{-1}$, and an overall volume of the ceramic heat sink is larger than or equal to 8 $cm^3$.

3. The heat flux sensor according to claim 2, wherein the ceramic heat sink is made of any one of aluminum nitride ceramics, aluminum oxide ceramics and silicon nitride ceramics.

4. The heat flux sensor according to claim 1, wherein the single-crystal material has a thickness of 20 to 500 μm.

5. The heat flux sensor according to claim 4, wherein the upper surface and the lower surface of the single-crystal material are polished surfaces, which have a surface roughness RMS (Root Mean Square) of less than or equal to 1 nm.

6. The heat flux sensor according to claim 1, wherein the heat absorption layer has a thickness of 300 to 2000 nm.

7. The heat flux sensor according to claim 6, wherein the heat absorption layer is made of a C/SiC composite material having an atomic content of C element of larger than or equal to 65%.

8. The heat flux sensor according to claim 1, wherein the first metal electrode, the second metal electrode, the third metal electrode and the fourth metal electrode are Ni/Pt thin film electrodes or Ni/Au thin film electrodes; when the Ni/Pt thin film electrodes are adopted, for each of the Ni/Pt thin film electrodes, an Ni electrode with a thickness of 20 to 100 nm is first grown on the sensitive element, and a Pt electrode with a thickness of 50 to 100 nm is then grown on the Ni electrode; and, when the Ni/Au thin film electrodes are adopted, for each of the Ni/Au thin film electrodes, an Ni electrode with a thickness of 20 to 100 nm is first grown on the sensitive element, and an Au electrode with a thickness of 50 to 100 nm is then grown on the Ni electrode.

9. The heat flux sensor according to claim 1, wherein the fifth metal electrode is a Cu/Pt thin film electrode or a Cu/Au thin film electrode; when the Cu/Pt thin film electrode is adopted, a Cu electrode with a thickness of 20 to 30 μm is first grown on the ceramic heat sink, and a Pt electrode with a thickness of 50 to 150 nm is then grown on the Cu electrode; and, when the Cu/Au thin film electrode is adopted, a Cu electrode with a thickness of 20 to 30 μm is first grown on the ceramic heat sink, and an Au electrode with a thickness of 50 to 150 nm is then grown on the Cu electrode.

10. The heat flux sensor according to claim 1, wherein the thermally conductive and electrically insulative adhesive has a thickness of less than 30 μm.

11. The heat flux sensor according to claim 1, wherein an area of the fifth metal electrode is larger than an area of the fourth metal electrode in a transverse direction.

\* \* \* \* \*